April 20, 1926.  N. MADSEN  1,581,849
HULL CLEANING MACHINE FOR SHIPS AFLOAT
Original Filed July 15, 1921    10 Sheets-Sheet 1

April 20, 1926. 1,581,849
N. MADSEN
HULL CLEANING MACHINE FOR SHIPS AFLOAT
Original Filed July 15, 1921 10 Sheets-Sheet 3

April 20, 1926.

N. MADSEN

HULL CLEANING MACHINE FOR SHIPS AFLOAT

Original Filed July 15, 1921   10 Sheets-Sheet 10

Inventor;
Nils Madsen
By Frank Chase Jones
Attorney

Patented Apr. 20, 1926.

1,581,849

UNITED STATES PATENT OFFICE.

NILS MADSEN, OF LOS ANGELES, CALIFORNIA.

HULL-CLEANING MACHINE FOR SHIPS AFLOAT.

Application filed July 15, 1921, Serial No. 485,080. Renewed February 27, 1926.

*To all whom it may concern:*

Be it known that I, NILS MADSEN, a subject of the King of Norway, and a resident of Los Angeles, in the county of Los Angeles, in the State of California, have invented certain new and useful Improvements in Hull-Cleaning Machines for Ships Afloat, whereof the following is a specification.

This invention relates to a cleaning machine applicable to ships afloat and operative below and above the water line for removing barnacles and other extraneous adhering matter tending to impede the movement of the ship.

The principal object of the invention is to avoid the delay and expense incident to dry-docking ships for this purpose.

Another object of the invention is to provide a machine which is rapid, effective, and economical in the cleaning operation.

The machine comprises a power cleaning mechanism and a vacuum means for attaching and holding said mechanism in working position on the hull or surface to be cleaned.

The machine comprises more in detail a power cleaning mechanism and an endless chain of articulated vacuum shoes adapted to hold the machine in contact with the hull of the vessel, means adapted to pass said shoes along the bottom or side of the vessel, and pipes, valves and suction mechanism for withdrawing the water and air from the spaces on the ship's side inclosed by the shoes in contact therewith.

The machine may be embodied in various ways to traverse the hull vertically, horizontally or otherwise. It may be carried on or form a part of a submersible vessel or tank; and it may be towed by a companion boat or carried by and operated from a crane boat which is secured by ropes to the ship to be cleaned and provided with spacing devices adapted to hold it in proper relation to the ship during the cleaning operation.

The same reference characters indicate corresponding parts in the different figures.

In the form of embodiment herein illustrated, the machine comprises a base, a brush cleaning mechanism mounted thereon, and a vacuum cleaning attaching mechanism flexibly connected with said base.

The base A is preferably flotable and adapted for connection with a handling crane mounted on a scow or crane boat. In the form shown it comprises two longitudinal buoyancy tanks 10 and 11 spaced apart in parallel relation, and cross members 12 and 13 rigidly connecting said tanks at their opposite ends. The base is provided at one or both ends with a series of lugs 14 with which the tackling devices of the handling crane or companion boat may be connected for towing the apparatus or for playing it up and down or otherwise against the side of the ship to be cleaned.

The tanks are preferably constructed of metal and of a size sufficient to maintain the buoyancy of the base and the mechanism placed thereon. Standards 15 and 16 are oppositely secured respectively to the tanks 11 and 10 adjacent to one end of the base and standards 17 and 18 are oppositely secured to said tanks adjacent to the other end of the base. A cross beam 19, preferably constructed of angle iron and provided with a series of eyes 20 is rigidly secured at its opposite ends to the standards 15 and 16 and a similar cross beam 21 having eyes 22 is rigidly secured at its opposite ends to the standards 17 and 18. An angular bracket 23 having a longitudinal shaft bearing 24 and a transverse shaft bearing 25 is centrally mounted on the cross member 12 and a corresponding angular bracket 26 having a longitudinal shaft bearing 27 and a transverse shaft bearing 28 is centrally mounted on the cross member 13. A central longitudinal shaft 30 which may be jointed or otherwise made flexible is supported near its opposite ends in the longitudinal bearings of the angular brackets 23 and 26 and disposed vertically above the space between the tanks. This shaft is provided at its opposite ends with bevel gears 31 and 32 and near its opposite ends and between its bearings with worms 33 and 34.

A motor 35 of any suitable kind or construction for the purpose is mounted on the cross member 12 and has a driving shaft 36 supported in the transverse bearing of the angular bracket 23. This driving shaft carries a bevel gear 37 which meshes with and drives the bevel gear 31 fixed on the central longitudinal shaft 30.

A transverse brush shaft 40 is supported in bearings at the upper ends of the standards 15 and 16 and a similar brush shaft 41 is supported in bearings at the upper ends of the standards 17 and 18. These brush shafts carry similar rotary scrubbing brushes 42 and 43 composed of wire bristles or other suitable material and are provided at their outer ends with pulleys 44 and 45 preferably in sprocket form. Short transverse shafts 46 and 47 (the first of which may be an extension of the driving shaft 36) carry at their outer ends pulleys 48 and 49, preferably in sprocket form, and sprocket or plain belts 48' and 49' connect said last named pulleys with the pulleys of the brush shafts. The shaft 46 is driven by its connection with the driving shaft of the motor and the shaft 47 is provided with a bevel gear 47' which meshes with and is driven by the bevel gear 32 of said longitudinal shaft, whereby motion is imparted to the rotary scrubbing brushes 42 and 43.

In the embodiment shown two endless vacuum belts B and C are disposed in parallel relation, spaced apart from each other and flexibly suspended or stretched between the cross beams 19 and 21. The belt B runs over vacuum sprocket pulleys D and E and the companion belt C runs over vacuum sprocket pulleys F and G at the opposition ends or turns of the belt. Suspension links 50 and 51 engage at their inner ends the hubs of each of these vacuum sprocket wheels and contractile spiral springs 52 connect said links with the cross beams 19 and 21 at opposite ends of the machine, whereby the belts have a yielding or elastic connection with the base A. The hubs of the sprocket pulleys D and F are connected by an intermediate shaft 53 which carries a worm wheel 54 and the hubs of the sprocket pulleys E and G are connected by an intermediate shaft 55 which carries a worm wheel 56. The ends of the shafts may be angular and rest in angular sockets of the hubs.

The worm wheel 54 is engaged and driven by the worm 33 on the central longitudinal shaft 30 and the worm wheel 56 is engaged and driven by the worm 34 on said central shaft. These worm wheels are inclosed in worm wheel casings 57 and 58 mounted respectively on said connecting shafts between adjacent sprocket pulleys. The casing 57 has a downward arm or lug 59 which depends between transverse angle bars 60 and 61 attached to the tops of tanks 10 and 11 and spanning the space between them. The casing 58 has a similar thrust lug 62 which depends between the transverse angle bars 63 and 64. As the vacuum sprocket pulleys D and E or F and G are turned forward or backward the thrust is taken by the lugs 59 and 61 pressing against said transverse angle bars of the tanks.

The endless vacuum belts and the vacuum sprocket wheels carrying said belts are of like or similar construction and a description of one of each will suffice for the other.

Each vacuum sprocket pulley comprises a hollow hub 70 having radial hollow spokes 71 and lateral hollow extensions or bosses 72 and 73. Sleeves 74 and 75 are mounted on these hub extensions on opposite sides of the central portion 70. These sleeves are provided with radial flanges 76 and 77 which have holes 78 for a purpose hereinafter set forth. The boss 71 is provided at its outer ends with an external screw-thread 79. A cap 80 is placed over the outer ends of the boss 72 and its sleeve 76 and a cap 81 is placed over the outer ends of the boss 73 and its sleeve 77. A pipe coupling 85 having a stuffing box 86 is screwed to the outer end of the outer boss 72 and a flexible pipe 87 connects the outer end of said coupling with a flexible pipe 88, which in turn connects with a longitudinal pipe 89 designed for connection with a suitable suction means. Each sprocket spoke 71 has a skeleton or ring partition 90 dividing it into an inner chamber 91 communicating with the hollow hub 70 and an outer chamber 92 communicating through a central opening 93 in said partition with said inner chamber. The outer end of the spoke has a recessed nozzle 94 which is provided with a central stemway 95, gridiron ports 96 surrounding said stemway and a valve seat 97 having a packing 98 surrounding said ports. The inner face of the nozzle is also provided with a valve seat 99 surrounding said ports. A valve 100 having a stem 101 which slides in said stemway is provided on its outer face with a packing 102 adapted to rest on said inner valve seat. The stem of the valve 100 is provided with a contact cap 103 which when the valve is closed projects beyond the outer face of the packing 98 of the valve seat 97. A spiral spring 104 disposed between the skeleton partition 90 and said valve 100, tends to keep said valve closed and to permit it to open under contact of the valve stems. The outer chamber 92 of the sprocket spoke is always open to the inner chamber 91 thereof thru the opening 93 in the partition 90. The inner chamber of each sprocket spoke communicates with the hollow hub 70 thereof and thence thru the hollow boss 72 thereof and pipes hereinbefore referred to, with the air exhaust mechanism. The outer chamber 92 of the sprocket spoke is opened to one of the vacuum shoes of one of the vacuum belts by contact of said shoe with the sprocket spoke in the manner hereinafter described.

Figure 8:
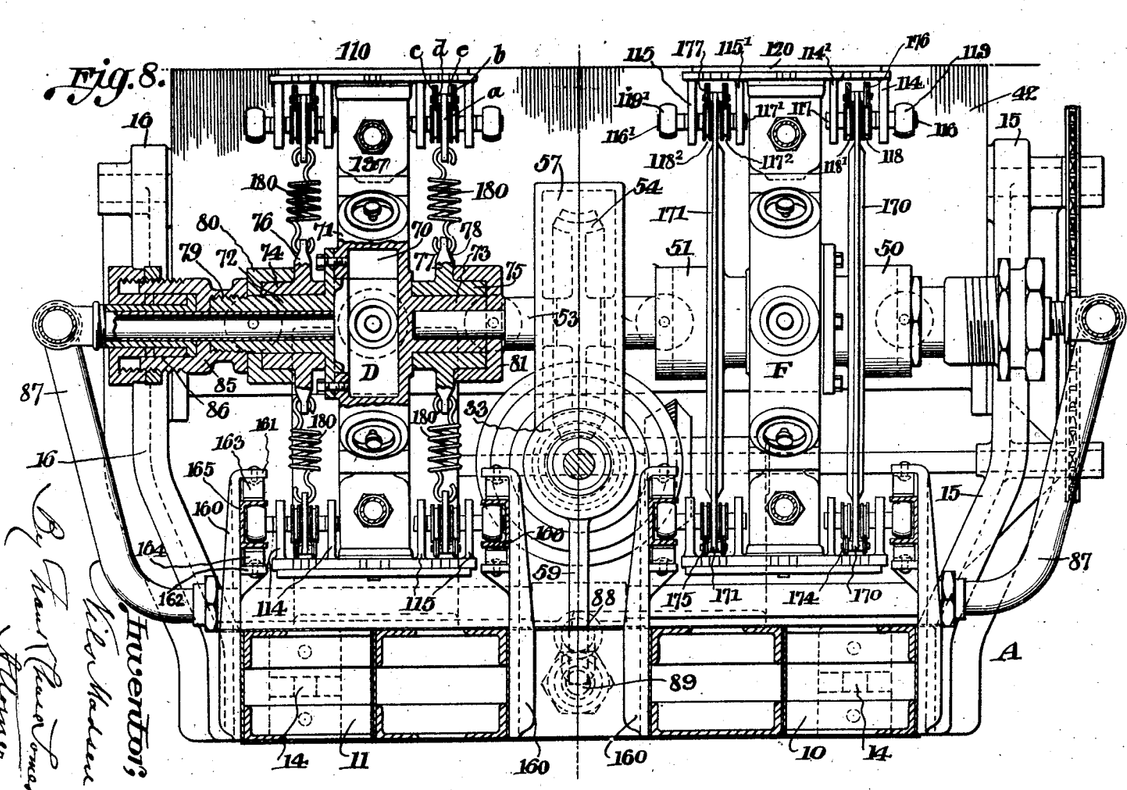
Fig. 8 represents in its central portion an end elevation thereof; at the left of said central portion, a transverse section on line 8—8 of Fig. 4, and at the right a transverse section on line 8'—8' of Fig. 4.

Each vacuum belt is composed of a series of valved vacuum shoes 110 hinged together to form an endless chain, whereof each shoe constitutes a link. To provide for this connection each vacuum shoe is provided on one side edge with a pair of stud hinge lugs 111 and on its opposite side edge with a pair of recessed hinge lugs 112. The hinge lugs of one shoe are connected by pintles 113 with the companion lugs of the adjacent shoes to form an endless flexible vacuum belt. Each vacuum shoe is provided on its rear face on one side of its center with a pair of brackets 114 and 114' and on the other side of its center with a similar pair of brackets 115 and 115'. (See Fig. 8). A short shaft 116 is supported in the brackets 114 and a short shaft 117 is supported in the bracket 114'. These shafts are in alinement but spaced apart at their inner ends. The shaft 116 carries between the brackets 114 and 114' a trolley wheel 118 and at its outer end a wheel 119. The shaft 117 carries between the brackets 114 and 114' a trolley wheel 118'. A short shaft 116' is supported in one of the brackets 115 and a short shaft 117' is supported in the other bracket 115', said shafts being in alinement and spaced apart at their inner ends. The shaft 116' is provided at its inner end with a trolley wheel 118'' and at its outer end with a wheel 119'. The shaft 117' is provided at its outer end with a trolley wheel 117².

Figures 12, 13:
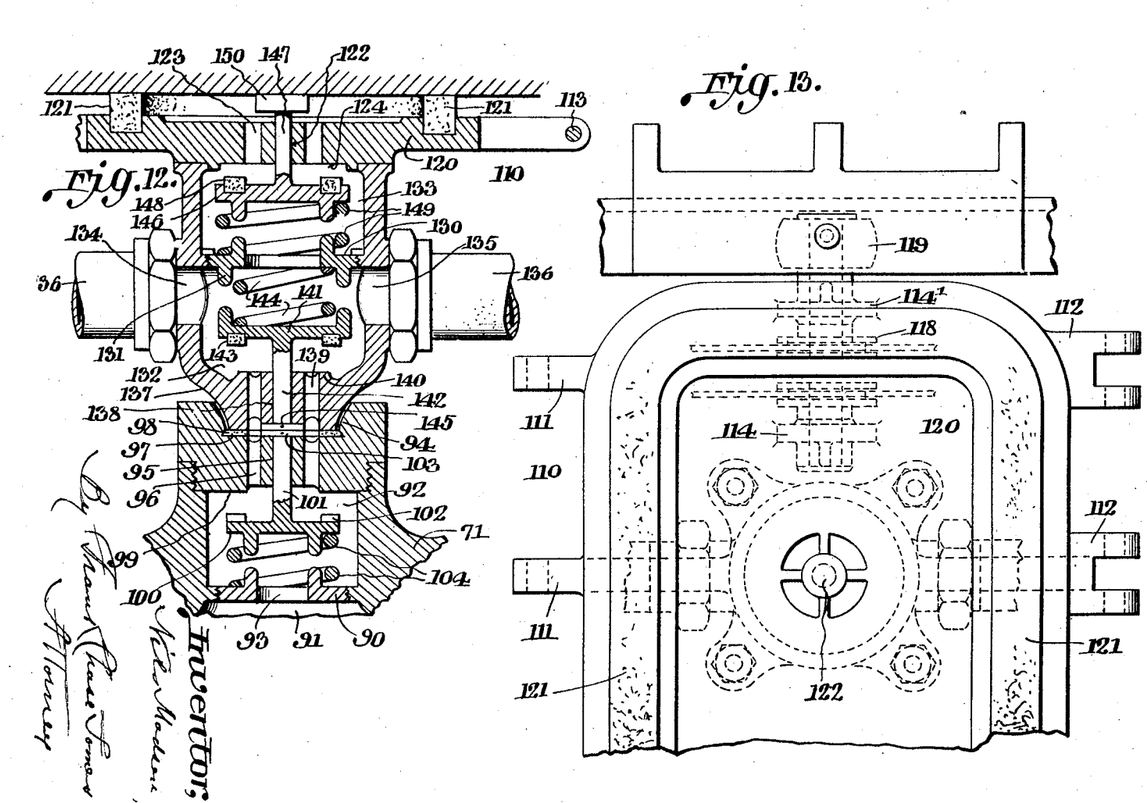
Fig. 12 represents on an enlarged scale a longitudinal section of the belt in the act of passing to or from a sprocket onto or off its operative run, both the shoe valves and the sprocket valve being open, and the suction current passing thru the suction valve direct to the conjunctive sprocket and also thru the lateral shoe connecting pipes and shoes to the shoes in contact with the sprockets of the other sprocket wheel.
Fig. 13 represents on an enlarged scale a plan view of the working face of a fragment of a sole plate constituting a part of one of the vacuum shoes and a fragment of a supplemental yieldable runway for connecting the shoes to the flotable base.
Figure 14:
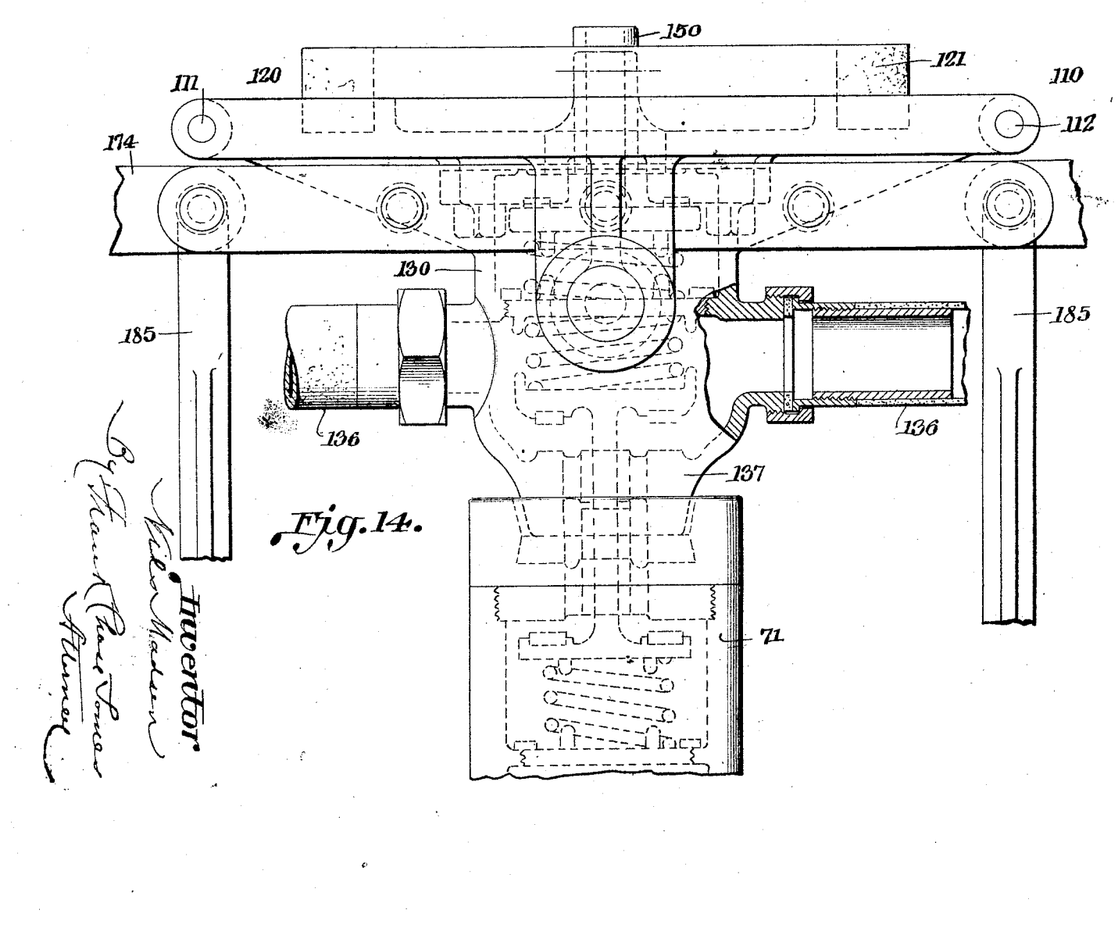
Fig. 14 represents on an enlarged scale a side elevation partly in section of fragments of a vacuum belt, sprocket, operative runway and links connecting said runway with the return runway.
Figures 15, 16:
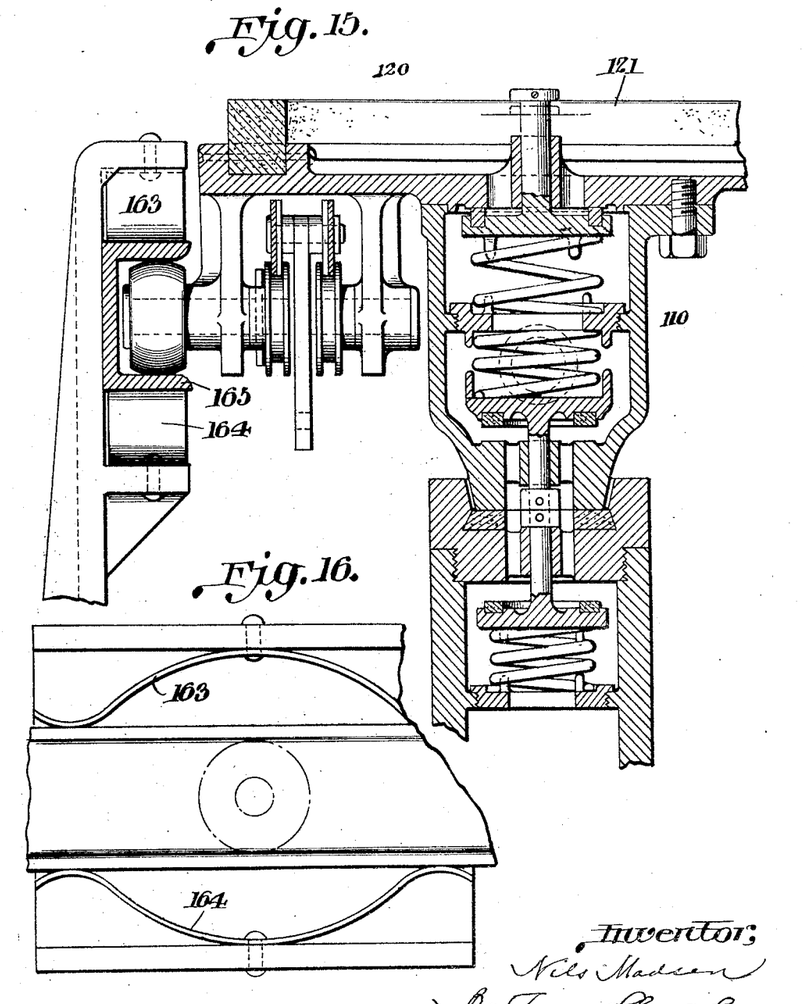
Fig. 15 represents on an enlarged scale a transverse section thru a vacuum belt, sprocket, runway and supplemental runway connected with the flotable base, the shoe passing to or from the sprocket onto or off its return run and its suction valve being therefore in closed position under the action of its spring.
Fig. 16 represents on an enlarged scale a side elevation of a fragment of a supplemental return runway connected with the flotable base for suspending the latter from the vacuum belt or yieldingly connecting it therewith.

Each shoe 110 comprises a suction or sole plate 120 for contact with the surface to be cleaned, and a body in the form of a duplex valve chamber 130 bolted or otherwise fastened to the back of said sole or contact plate; see Figs. 12 and 13. The sole plate 120 is recessed on its contact face and provided on said face with a sealing ring 121 composed of rubber or other suitable material surrounding the recess of the plate and adapted to form water-tight joint with the hull of the ship when the shoe is pressed against it. The sole plate is provided with a central opening 122 which forms a stemway, and adjacent thereto with gridiron ports 123 and surrounding said ports with a valve seat 124 on its rear face. The duplex valve chamber 130, bolted to the back of said plate between the shafts 116 and 117 and their supporting brackets, covers said stemway and ports. This chamber is divided by a skeleton partition 131 into an inner valve compartment 132 adapted to communicate with the outer valve compartment 92 of a sprocket spoke, and an outer valve compartment 133 which is automatically opened to said inner compartment at the proper time by valve action. The duplex valve chamber is provided at its inner compartment with lateral outlet ports 134 and 135 at diametrically opposite points. Short flexible pipes 136, preferably in the form of hose, connect the outlet ports of adjacent vacuum shoes, uniting them in a continuous series. This duplex valve chamber is shaped at one end into a tapered stud nozzle 137 adapted to engage the recessed nozzle 94 of any one of the sprocket spokes. This stud nozzle is provided with a central stemway 138, gridiron ports 139 around said stemway and an inner valve seat 140 surrounding said ports. An outlet valve 141 having a stem 142 which slides in said stemway is disposed in the inner compartment 132. This valve is provided with an annular packing 143 which rests on said valve seat when the valve is closed. The valve is held normally closed by an expansive spring 144 disposed between it and the skeleton partition 131. The stem 142 of the valve 141 is provided with a contact cap 145 which extends beyond the end of a stud nozzle 137 when the valve is closed and is actuated as hereinafter described to open said valve. A suction valve 146 disposed in the outer compartment is operative to close and open the gridiron ports of the sole plate 120. This valve has a stem 147 which plays in the stemway 122 of the shoe, and an annular packing 148 which rests on the valve seat 124 when the valve is closed. An expansive spiral spring 149 disposed between the skeleton partition 131 and the valve 146 tends to hold the latter to its seat. The stem 147 is provided at its outer end with a contact cap 150 which normally projects beyond the plane of the packing or sealing ring 121 and causes the valve to open against the tension of its spring when the shoe is pressed into contact with the ship hull to be cleaned.

Means are provided for flexibly connecting or supporting the base with or from the endless belts. For this purpose the tanks 10 and 11 are provided at intervals along their opposite sides with upright brackets 160, each bracket having inturned lugs 161 and 162 spaced apart vertically and vertical guideway between said lugs. Upward springs 163 and similar downward springs 164, preferably in semi-elliptic form are attached to the respective lugs aforesaid. Straight longitudinal channel beams 165 and 166, with their channels facing inward are disposed in the opposite brackets between these springs and are freely movable up and down subject to the tension of said springs, within the spaces between said lugs.

Endless trackways are provided for the traverse, guidance and support of the endless vacuum belts. There are four of these trackways, H and I for the belt B and J and K for the belt C. The trackway H is threaded along the vacuum shoes 110 on the outer side of the valve chambers 130 between the brackets 114 and the trackway I is threaded along the same vacuum shoes on the other side of said chambers between the brackets 115. The trackways J and K are likewise threaded along the belt C on opposite sides of its valve chamber. These several trackways are alike and a detailed description of one will answer for the others.

Each trackway comprises two curved trolley beams 170 and 171 at one end of the machine, spaced apart a distance to correspond with the space between the pairs of trolleys aforesaid, two similar curved trolley beams 172 and 173 correspondingly spaced apart at the other end of the machine, the concave faces of one pair facing the concave faces of the other pair. Straight flexible trolley beams 174 and 175 connect the lower ends of the curved trolley beams 170 and 171 with the lower ends of the curved trolley beams 172 and 173 and constitute the straight return runway for the vacuum belt B. Straight flexible trolley beams 176 and 177 connect the upper ends of the curved trolley beams 170 and 171 with the upper ends of the curved trolley beams 172 and 173 and constitute the operative runway for the vacuum belt B.

Figures 9, 10, 11:
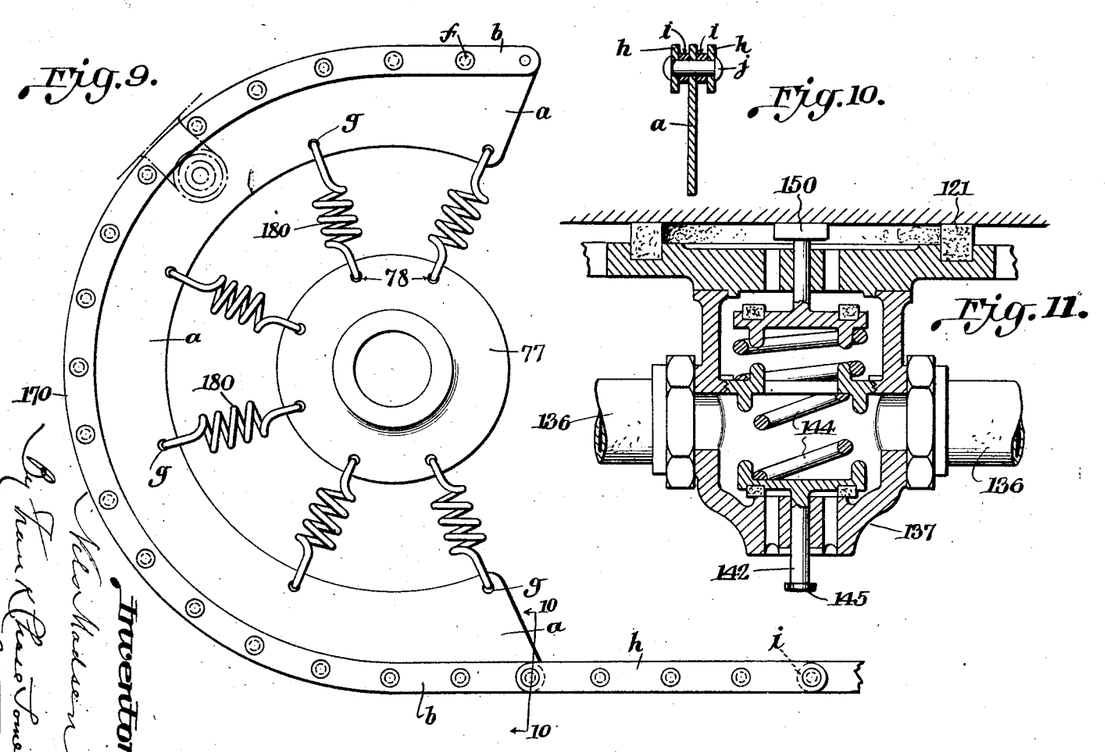
Fig. 9 represents on an enlarged scale a side elevation of one of the vacuum belt end runways and its elastic central support adapted for mounting on the hub of one of the sprocket wheels.
Fig. 10 represents on an enlarged scale a transverse section thru the joint connecting the upper end of the left curved runway with the operative runway of said belt.
Fig. 11 represents on an enlarged scale a longitudinal section of a fragment of a vacuum belt embracing a single vacuum shoe in its operative traverse between sprockets in contact with a surface to be cleaned, showing the suction valve open and the outlet valve closed, the suction current being thru the suction valve and thru the lateral shoe connecting pipes of the shoes of the sprocket wheels.

Each curved trolley beam is T-shaped in cross section and comprises a central web $a$, track rails $b$ and $c$ spaced therefrom on opposite sides thereof by sleeves $d$ and $e$, and all connect by bolts $f$. The web $a$ is provided at intervals with eyes $g$ and a series of radially disposed contractile spiral springs 180 are connected at their outer ends with the holes 78 in the radial flanges 76 and 77 of the hubs of the vacuum sprocket pulleys. These springs support said endless trackways and permit a yielding thereof with relation to the belts. The straight trolley beams or tracks are each preferably composed of parallel links $h$ of thin bar metal set edgewise and connected by sleeves $i$ and bolts $j$ as shown in Fig. 10. The trolley wheels 118 and 118' ride on the inner surfaces or inner edges of said tracks. The operative and return or upper and lower straight trolley tracks are connected by a series of suspension links 185 and in the traverse of the vacuum belt these suspension links are passed in the spaces between the shafts 116 and 117, which are supported respectively in the pairs of brackets 114 and 115 on the vacuum shoes.

As either vacuum belt travels around in its endless course over its supporting sprocket wheels all the vacuum shoes 110 which are passing between said wheels, including those of the operative as well as those of the return run, have their outlet valves 141 closed by their springs 144; the suction valves 146 which are passing over the sprocket wheels and between said wheels on the return run are closed; the outlet valves 141 which are passing over the sprocket wheels are open by contact with the valves 100 of said wheels; and the suction valves 146 of the operative run between the sprocket wheels are open by contact with the surface to be cleaned. In such case the water or air drawn from the surface of the ship within the suction chambers of the vacuum shoes in contact therewith enters the outer valve chambers 133 thru the gridiron ports and the open suction valves 146 of the operating series of shoes; thence passes thru the skeleton partition 131 into the inner chambers 132 of said series of shoes; thence passes in opposite directions thru the connecting pipes 136 of said operating series to the outer chambers of those vacuum shoes which are passing around the sprocket wheels; thence thru the open outlet valves 141 of said chambers and the open inlet valves 100 of those sprocket spokes which are in engagement with the belt into the hollow spoke of said wheels; thence to the hollow hubs thereof; thence thru said hubs to pipes 86 and thence thru the pipes 87, 88, and 89 to the suction pump.

The suspension links 185 in their relation to the tanks furnish an inward pull that will insure suitable thrust for the scrubbing brushes 42 and 43 to do their work. The buoyancy tanks 10 and 11 are of sufficient capacity to float the entire apparatus.

Figure 1:
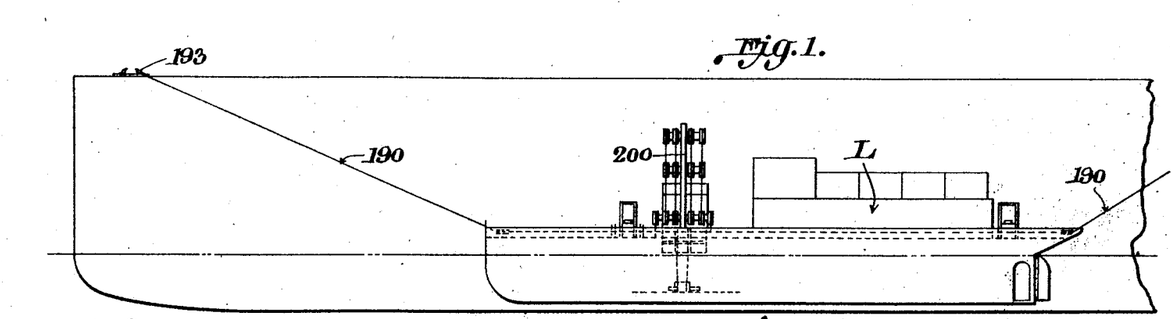
Figure 1 of the accompanying drawings represents a side elevation of a fragment of a ship to be cleaned, a scow alongside, and this cleaning machine mounted on the scow and suspended therefrom in position to operate vertically on the hull of the ship.
Figures 2, 3:
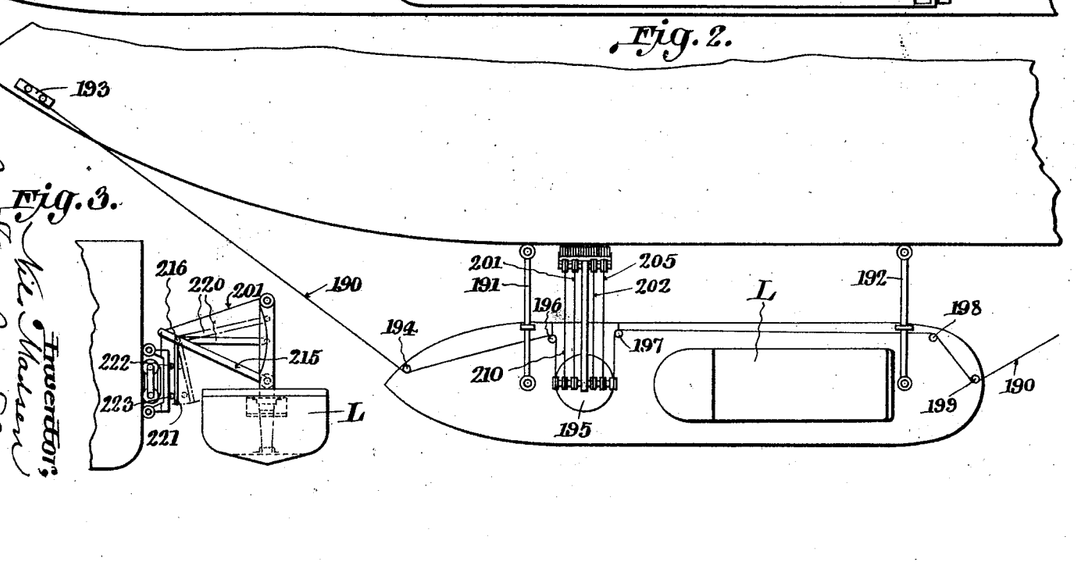
Fig. 2 represents a plan thereof, showing the spaced relation of the scow to the ship during the cleaning operation.
Fig. 3 represents an end elevation thereof.
Figure 4:
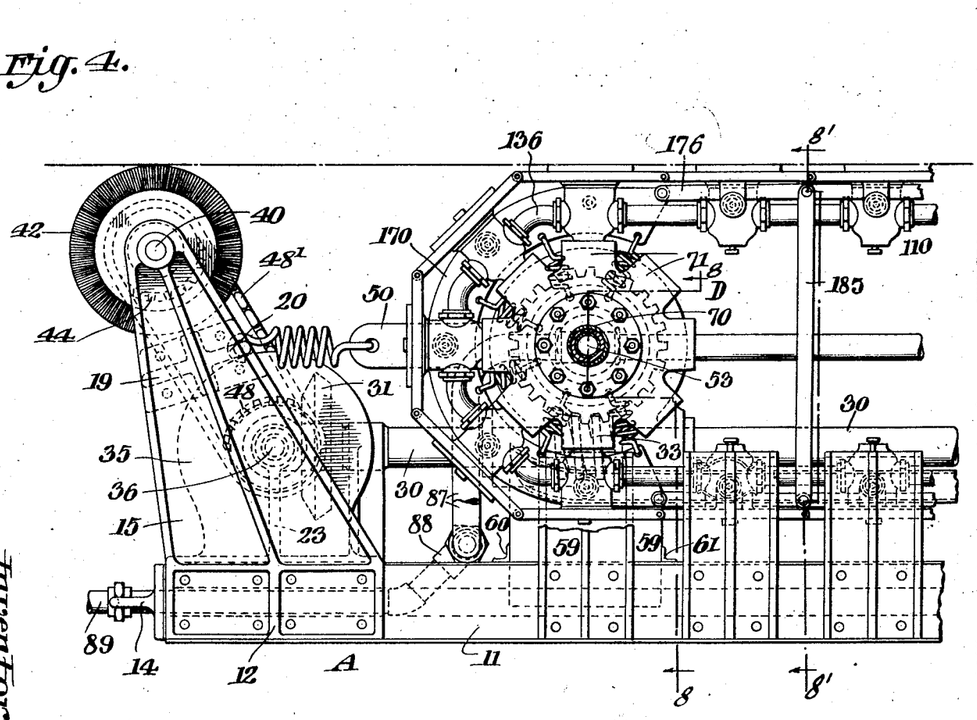
Fig. 4, assuming the cleaning machine disposed in horizontal or floating position, represents a side elevation of the left hand portion thereof, the sprocket wheel hub being in section.
Figure 5:
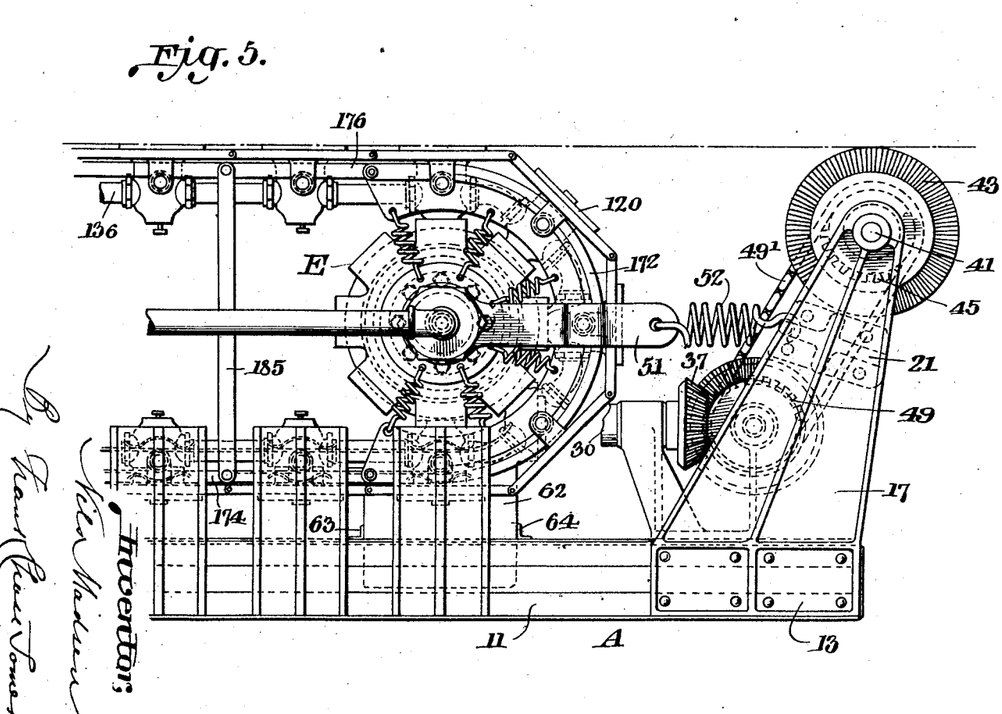
Fig. 5 represents correspondingly a side elevation of the right hand portion thereof, showing a fragment of the pipe for connecting said hub with the suction pump.
Figure 6:
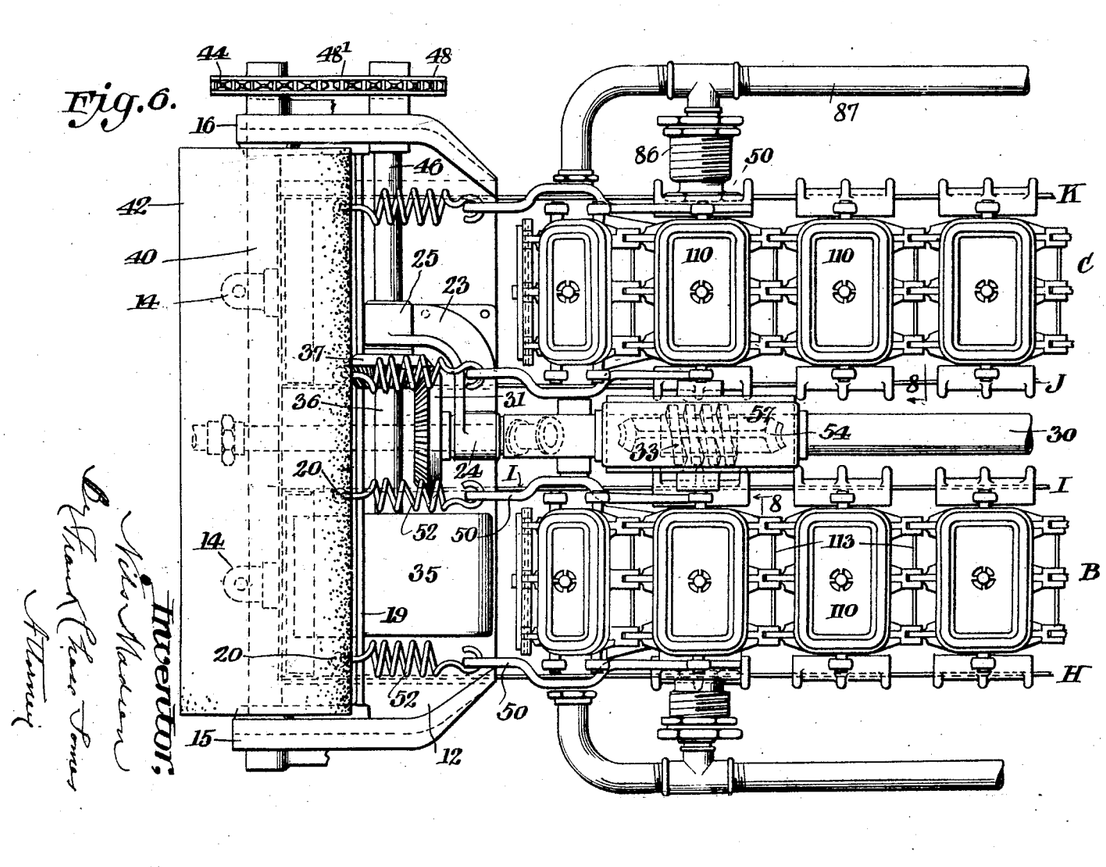
Fig. 6 represents correspondingly a view of the working face or plan of the left hand portion of the machine.
Figure 7:
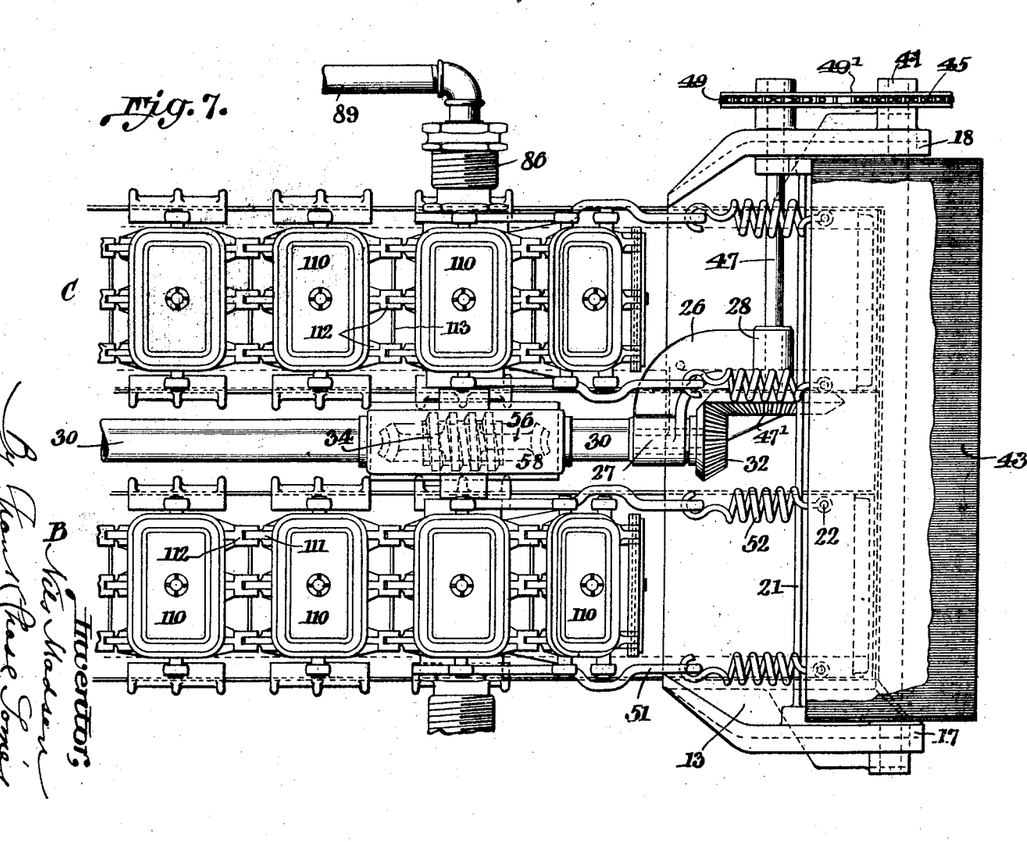
Fig. 7 represents correspondingly a view of the working face or plan of the right hand portion of the machine.

Figure 1 illustrates the machine as operated from a crane boat and worked up and down on the side of a ship in a traverse extending above the water line. The crane boat L is held to the ship to be cleaned by a shifting rope or cable 190 and spaced from said ship by spacers 191 and 192. The rope 190 of wire or other material is detachably connected at its opposite ends to the deck of the ship to be cleaned, as at the point 193, and passed over pulleys 194 at one end of the crane boat, over a drum 195, pulleys 196 and 197 on opposite sides of said drum and a pulley 198 and 199 at the other end of said boat.

A crane 200 is mounted on the crane boat and provided with means for carrying and operating hoisting cables 201 and 202, which are hooked to the eye lugs or pads 14 at one end of the base. This crane also carries reels for winding the vacuum hose 205, reels for winding electric cables 210 and drums for the shifting cables 190. A crane boom 215 has a stud 216 on which is fulcrumed a bell crank lever comprising a practically horizontal arm 220 and a dependent arm 221. Suitable gearing or other means for manipulating the bell crank lever is connected with the arm 220 thereof and the dependent arm 221 is provided with rollers 222 and 223 which engage the cleaning machine and press it against the hull of the ship, forcing the operative runs of the vacuum belts into contact with the surface to be cleaned and thereby opening the stems of the valves of the sole plates of the vacuum shoes, thus establishing communication between the air pumps and the vacuum recesses and binding the belts to the ship's side by pneumatic or hydraulic suction. The motor is then started giving motion to the vacuum belts B and C. The machine follows the side of the ship a suitable distance downward, then the motor is reversed and the machine works its way upward to its starting point, along the path it made going downward. Then the vacuum is broken, releasing the vacuum belts from their vacuum attachment to the side of the ship; then the machine is shifted to its next space by moving the crane boat along the ship, the vacuum re-established and the handling operation repeated. By this adjustment the same surface may be scrubbed four times by an apparatus having two brushes, in one upward and downward movement thereof, the adjustment along the ship at each movement of the apparatus being equal to the length of the brushes.

This machine may be used for cleaning the hulls of vessels in dry docks as well as afloat.

I claim as my invention:

1. A cleaning machine comprising an endless belt of vacuum shoes adapted to make vacuum contact with the surface to be cleaned, and an endless trackway for said belt.

2. The combination of a cleaning mechanism, a flexible series of vacuum shoes adapted to make vacuum contact with the hull of a vessel, pipes, valves and suction mechanism connected with said shoes and adapted to withdraw water or air from the spaces on said hull inclosed thereby, and means adapted to move said shoes under suction along said hull.

3. The combination of a cleaning mechanism, a flexible series of vacuum shoes adapted to make vacuum contact with the hull of a vessel, pipes, valves and suction mechanism connected with said shoes and adapted to withdraw water or air from the spaces on said hull inclosed thereby, means adapted to move said shoes under suction along said hull, and means for shifting the position of said series on said hull.

4. In a machine of the character described the combination of a flotable base, a brush cleaning mechanism mounted thereon, a vacuum attaching mechanism mounted thereon, and means for simultaneously operating said mechanisms.

5. The combination of a ship hull cleaning machine comprising a cleaning mechanism, a vacuum attaching mechanism having a flexible series of vacuum shoes, and a tackling mechanism operative to project said machine to a ship hull.

6. The combination of a ship hull cleaning machine comprising a cleaning mechanism, a vacuum attaching mechanism having a flexible series of vacuum shoes, a tackling mechanism operative to project said machine to a ship hull, and means for shifting said machine into different positions along said hull.

7. In a machine of the character described, the combination of sprocket wheels having hollow spokes provided with valves, an endless vacuum attaching belt comprising a series of vacuum shoes hinged together, and flexible pipes connecting said shoes, said shoes having suction sole plates for pneumatic contact with the surface to be cleaned and normally closed valves opened by such contact, and said hollow sprocket spokes having normally closed valves opened by contact of said vacuum shoes, suction mechanism connected with said sprocket spokes, and means for supporting said sprocket wheels.

8. In a machine of the character described the combination of sprocket wheels having hollow spokes provided with valves, an endless vacuum attaching belt comprising a series of vacuum shoes hinged together and adapted to form pneumatic contact with the surface to be cleaned, and flexible pipes connecting said shoes; said shoes having normally closed valves opened by said surface contact and said hollow sprocket spokes having normally closed valves opened by contact of said vacuum shoes, suction mechanism connected with said sprocket spokes, means for supporting said sprocket wheels, and an endless trackway for said vacuum belt.

9. In a machine of the character described the combination of sprocket wheels having hollow spokes provided with valves, an endless vacuum attaching belt comprising a series of vacuum shoes hinged together and adapted to form pneumatic contact with the surface to be cleaned, and flexible pipes connecting said shoes; said shoes having normally closed valves opened by said surface contact and said hollow sprocket spokes having normally closed valves opened by contact of said vacuum shoes, suction mechanism connected with said sprocket spokes, and yielding supporting means for said sprocket wheels.

10. In a machine of the character described the combination of sprocket wheels having hollow spokes provided with valves an endless vacuum attaching belt comprising a series of vacuum shoes hinged together and adapted to form pneumatic contact with the surface to be cleaned, and flexible pipes connecting said shoes; said shoes having normally closed valves opened by said surface contact and said hollow sprocket spokes having normally closed valves opened by contact of said vacuum shoes, suction mechanism connected with said sprocket spokes, means for supporting said sprocket wheels, an endless trackway for said vacuum belt, and yielding connections between said sprocket wheels and said trackway.

11. In a machine of the character described the combination of a base comprising tanks spaced apart in parallel relation and rigidly connected, frames at opposite ends of said base, transverse shafts, yielding supports connecting said shafts with said frames, sprocket wheels disposed on said shafts and provided with hollow spokes, an endless belt of valved vacuum shoes carried by said sprocket wheels and automatically operative by contact with the surface to be cleaned, flexible pipes connecting said shoes, normally closed valves in said shoes actuated by contact with the surface to be cleaned, normally closed valves in said hollow sprockets actuated by contact of said vacuum shoes, and suction devices connecting with said sprocket wheels.

12. In a machine of the character described the combination of a base comprising tanks spaced apart in parallel relation and rigidly connected, frames at opposite ends of said base, rotary brushes supported in said frames, a longitudinal shaft, and transmitting mechanisms connecting opposite ends of said longitudinal shaft with said brushes.

13. In a machine of the character described the combination of a base, frames at opposite ends thereof, transverse shafts, yielding supports connecting said shafts with said frames, sprocket wheels disposed on said shafts and provided with hollow spokes, an endless belt of valved vacuum shoes carried by said sprocket wheels and operative by contact with the surface to be cleaned, flexible pipes connecting said shoes, worm wheels on said transverse shafts, a flexible longitudinal shaft provided with worms engaging said worm wheels, and suction devices connected with said sprocket wheels.

14. In a machine of the character described the combination of a base, frames at opposite ends thereof, transverse shafts, yielding supports connecting said shafts with said frames, sprocket wheels disposed apart on each of said transverse shafts and provided with hollow spokes, endless belts of valved shoes carried by their respective sprocket wheels and operative by contact with the surface to be cleaned, worm wheels on said transverse shafts between their respective sprocket wheels, a flexible longitudinal shaft disposed between said belts and provided with worms engaging said worm wheels, and suction devices connected with said sprocket wheels.

15. In a machine of the character described the combination of a base, frames disposed apart thereon, transverse shafts, yielding supports connecting said shafts with said frames, sprocket wheels disposed on said shafts and provided with hollow spokes, an endless belt of valved vacuum shoes carried by said sprocket wheels, endless trackways on opposite sides of said sprocket wheels, yielding connections between said endless belts and the hubs of the sprocket wheels, and suction devices connecting with said sprocket wheels.

16. In a device of the character described the combination of vacuum sprocket wheels, suction devices connected therewith, an endless belt of valved vacuum shoes carried by said sprocket wheels and provided with a pair of shafts spaced apart in alinement, each carrying a trolley wheel, and an endless trackway comprising curved end trolley beams having parallel tracks and central webs which are passed between said shafts during the movement of said endless belt and longitudinal trolley beams connecting said curved trolley beams.

17. In a device of the character described the combination of vacuum sprocket wheels, suction devices connected therewith, an endless belt of valved vacuum shoes carried by said sprocket wheels and provided with two pairs of shafts, the shafts of each pair being spaced apart in alinement, and each carrying a trolley wheel, and endless trackways comprising curved end trolley beams having parallel tracks and central webs which are passed between said shafts during the movement of said endless belts and longitudinal trolley beams connecting the curved trolley beams of said trackways.

18. In a device of the character described the combination of vacuum sprocket wheels, suction devices connected therewith, an endless belt of valved vacuum shoes carried by said sprocket wheels and provided with a pair of shafts spaced apart in alinement, each carrying a trolley wheel, and an endless trackway comprising curved end trolley beams having parallel tracks and central webs which are passed between said shafts during the movement of said endless belt and longitudinal trolley beams composed of jointed sections connecting said curved trolley beams.

19. In a device of the character described the combination of vacuum sprocket wheels, suction devices connected therewith, an endless belt of valved vacuum shoes carried by said sprocket wheels and provided with a pair of shafts spaced apart in alinement, each carrying a trolley wheel, an endless trackway comprising curved end trolley beams having parallel tracks and central webs which are passed between said shafts during the movement of said endless belt and longitudinal trolley beams composed of jointed sections connecting said curved trolley beams, and links connecting the upper and lower longitudinal trolley beams, said links being passed between said shafts during the movement of the endless belt.

20. In a machine of the character described the combination of a base provided on opposite sides with yielding runways, vacuum sprocket wheels, suction devices connected therewith, an endless belt of valved vacuum shoes carried by said sprocket wheels and provided with shafts carrying sprocket wheels and supplemental wheels adapted to engage said yielding runways, and an endless trackway comprising curved end trolley beams and longitudinal trolley beams on which said trolleys travel.

21. A machine of the character described comprising rotary cleaning brushes disposed apart from each other, and a flexible endless attaching belt of vacuum shoes disposed between said brushes.

22. In a machine of the character described a valved vacuum shoe adapted to form a link in an endless vacuum belt and provided with a sole plate having a recessed contact face provided with a sealing ring adapted to form pneumatic contact with the surface to be cleaned.

23. In a machine of the character described a vacuum shoe adapted to form a link in an endless vacuum belt and provided with a sole plate having a recessed contact face provided with a sealing ring adapted to form pneumatic contact with the surface to be cleaned, and with an automatic valve having a stem projecting beyond said sealing ring and adapted to be pressed open by contact of said face with the said surface.

24. In a machine of the character described, a vacuum shoe adapted to form a link in an endless vacuum belt and provided with a sole plate having a recessed contact face provided with a sealing ring adapted to form pneumatic contact with the surface to be cleaned, and with a duplex valve chamber provided with spring seated valves having projecting stems adapted for exterior contacts to open said valves.

25. In a device of the character described the combination of sprocket wheels having hollow spokes provided with spring seated valves having projecting actuating stems, and an endless vacuum belt comprising a series of vacuum shoes hinged together and respectively provided with suction sole plates and duplex valve chambers carrying spring seated valves having projecting stems, the projecting stem of one of said valves being actuated by engagement with the surface to be cleaned and the projecting stem of the other valve being actuated by engagement with the projecting stem of the sprocket spoke.

26. In a machine of the character described the combination of sprocket wheels having hollow spokes provided with recessed nozzles and spring seated valves having projecting actuating means, and an endless vacuum belt comprising a series of vacuum shoes hinged together and respectively provided with suction sole plates and duplex valve chambers having stud nozzles and being provided with spring seated valves having projecting stems, the projecting stems of one series of said valves being actuated by engagement with the surface subjected to the cleaning operation and the projecting stems of the other series of said valves being actuated by engagement with the projecting stems of the sprocket spoke valves.

27. A machine of the character described comprising rotary cleaning brushes, and a flexible endless attaching belt of vacuum shoes disposed adjacent to said brushes.

28. A machine of the character described comprising a rotary cleaning brush, and a flexible endless attaching belt of vacuum shoes disposed adjacent to said brush.

29. A machine of the character described, comprising a cleaning means, and a flexible endless attaching belt of vacuum shoes disposed adjacent to said cleaning means.

NILS MADSEN.